United States Patent
Burch et al.

(10) Patent No.: US 6,210,262 B1
(45) Date of Patent: Apr. 3, 2001

(54) METHOD AND APPARATUS FOR PROCESSING FISH

(75) Inventors: Ronald H. Burch, Harahan; Kirk T. Selenberg, Metairie; Somsak S. Rodboon, Kenner; Eric W. Morales, New Orleans; Thomas J. DeRoche, Metairie, all of LA (US)

(73) Assignee: The Laitram Corporation, Harahan, LA (US)

( * ) Notice: Subject to any disclaimer, the term of this patent is extended or adjusted under 35 U.S.C. 154(b) by 0 days.

(21) Appl. No.: 09/254,253

(22) PCT Filed: Sep. 3, 1997

(86) PCT No.: PCT/US97/15838

§ 371 Date: Mar. 2, 1999

§ 102(e) Date: Mar. 2, 1999

(87) PCT Pub. No.: WO98/09530

PCT Pub. Date: May 12, 1998

Related U.S. Application Data

(60) Provisional application No. 60/025,466, filed on Sep. 5, 1996.

(51) Int. Cl.[7] .................................................. A22C 25/17
(52) U.S. Cl. .............................................. 452/99; 452/125
(58) Field of Search ................................ 452/99, 98, 101, 452/105, 125

(56) References Cited

U.S. PATENT DOCUMENTS

| | | |
|---|---|---|
| 1,694,018 | 12/1928 | Mudge et al. . |
| 1,921,055 | 8/1933 | Vucassovich . |
| 2,020,579 * | 11/1935 | Schlothan ........................ 452/126 |
| 3,546,738 * | 12/1970 | Heck .............................. 452/126 |
| 3,706,333 * | 12/1972 | Ammerman ...................... 452/126 |
| 3,709,142 | 1/1973 | Peterson . |
| 3,806,616 * | 4/1974 | Mencacci et al. ................. 426/376 |
| 4,020,528 * | 5/1977 | Lindbladh et al. ................ 452/125 |
| 4,106,193 | 8/1978 | Fisher et al. . |
| 4,700,547 * | 10/1987 | Hayashi ............................ 62/65 |
| 4,738,004 | 4/1988 | Lapeyre . |
| 4,765,030 | 8/1988 | Dubowik . |
| 5,183,697 | 2/1993 | Kee . |
| 5,184,973 * | 2/1993 | Orlando et al. ................... 452/125 |
| 5,397,593 | 3/1995 | Ito et al. . |
| 5,462,478 * | 10/1995 | Fredsby et al. ................... 452/135 |
| 5,857,352 * | 1/1999 | Liberman ......................... 62/345 |

FOREIGN PATENT DOCUMENTS

| | | |
|---|---|---|
| 2266220 | 10/1993 | (GB) . |
| 50694 * | 11/1983 | (JP) ............................ 452/126 |
| WO 90/08473 | 8/1990 | (WO) . |
| WO 91/12725 | 9/1991 | (WO) . |

* cited by examiner

Primary Examiner—Willis Little
(74) Attorney, Agent, or Firm—James T. Cronvich

(57) ABSTRACT

A method and apparatus for processing fish prior to canning to increase yield. The method includes the steps of first preparing the fish body for further processing by: removing (12) the tail, pectoral, and thoracic fins from a frozen fish body, removing the scales (20) from the frozen fish body, dipping the fish body in a hot bath (24) to thaw the skin and subdermal layer of the fish, dipping the fish body in a cooling bath (28) to stop fixer thawing, skinning (32) the fish body, and finally removing the dorsal and ventral fins (36). The method also includes the steps of preparing separated loin portions of the fish body for canning by: immersing frozen loin pieces in a heated broth bath (84) to coat the pieces with broth and then cooking the pieces in a hot water bath (88) until the internal temperature of the pieces reaches a preferred temperature. A preferred scaling apparatus includes a scaler assembly (42), a holder (44) for the fish body, and means for moving the scaler assembly close to the holder. Circumferentially spaced fingers (48) pivotally attached to the rotating scaler assembly contact the outer surface of the fish body and chip scales away.

14 Claims, 5 Drawing Sheets

METHOD AND APPARATUS FOR PROCESSING FISH

REFERENCE TO RELATED APPLICATIONS

This application claims the benefit of U.S. Provisional Application No. 60/025,466, filed on Sep. 5, 1996, entitled "Methods and Apparatus for Processing Fish."

TECHNICAL FIELD

The invention relates to fish processing and, more particularly, to the preparation of frozen fish bodies for skinning and to the subsequent treatment and cooking of fish meat pieces before canning to increase yield.

BACKGROUND ART

Today the processing of tuna fish for canning is a largely manual operation. To prepare the fish bodies for butchering, the frozen fish are first cooked. The skin, bone, entrails, blood meat, and other unwanted portions can then be cut from the delectable loin meat by hand. Finally, the cooked loin meat, along with broth and water, is put into cans and retorted.

A number of patents and patent applications owned by The Laitram Corporation, assignee of this invention, are directed to automating the tuna canning process. For example, U.S. Pat. No. 5,367,929, "Fluid Jet Cutting Knife Apparatus," discloses a computer-controlled fluid jet knife that is capable of cutting the skin away from a fish steak whose outline has been scanned and electronically defined. Some shortcomings of the described system in removing skin are its relatively slow speed, its computational complexity, and its inability to handle indentations in the skin. U.S. Pat. No. 5,569,068, "Method and Apparatus for Skinning Fish," shows an automated scraper system that uses spring-loaded scraper plates to scrape the skin from a partly frozen fish body conveyed through the scraper field. The scraper has some advantages over the water jet system in that it does not require computer control and the scrapers generally contact the entire skin surface. Nevertheless, the scrapers tend to skip or jump over the scales and pectoral and tail fins and do not perform so well in removing skin without gouging flesh in those areas. The task is made even more difficult because of the need to keep the fish in a frozen state to facilitate downline automated process steps, such as loin separation. Thus, there is a need to improve the skinning of frozen fish.

U.S. government regulations require that the average press weight of 24 cans of tuna exceed a specified minimum. The press weight is the weight of the drained contents of the cans after undergoing a press of 384 lb/in$^2$. The residual material after press is a combination of fish meat and retained moisture. The greater the retained weight after press, the greater is the yield because less meat must be packed into each can to meet the regulations. Because even small percentage increases in yield represent millions of dollars in income to a processor, high yield is a primary goal. Thus, another objective of the invention is to increase yield.

DISCLOSURE OF THE INVENTION

These needs and objectives are satisfied by methods and apparatus for preparing fish for skinning and canning having features of the invention.

A method for processing a frozen fish body for canning includes the steps of: immersing the frozen fish body in a first bath at a first temperature for a first period of time sufficient to thaw the skin and the subdermal layer of the fish body, immersing the fish body in a second bath at a second temperature lower than the first temperature for a second period of time to retard further thawing, scraping the skin from the frozen fish body, removing the fins from the frozen fish body, slicing steaks from the frozen fish body, separating blood meat portions from loin portions of each steak and retaining the frozen loin portions, maintaining the temperature of the frozen loin portions at a temperature substantially at or below the ice crystallization temperature, immersing the frozen loin portions in a broth mixture at a first temperature for a first period of time, and immersing the loin portions in water at a second temperature for a second period of time to cook the loin portions.

A method of skinning a frozen fish includes first immersing the body of the frozen fish in a hot water bath for a first period of time sufficient to thaw the skin and the subdermal layer of the fish. Then, the fish body is removed to a lower temperature bath, such as water at room temperature, to stop the thawing. Finally, the skin is scraped from the fish body. To enhance the scraping step, some or all of the scales, pectoral fins, thoracic fins, and tail fin can be removed at the outset.

Apparatus for removing the scales from a fish body includes a scaler assembly, a holder for the fish body, and means for moving the scaler assembly and the holder into close proximity. The scaler has a rotating assembly that rotates about an axis of rotation. Circumferentially spaced fingers are pivotally attached to the rotating assembly and extend outward from it. Means are provided to limit the pivotal movement of the fingers between two positions. The distal ends of the fingers project out a maximum radial distance from the axis of rotation at one of the limit positions. This maximum radial distance defines an outer sweep radius of the rotating scaler. As the fish body is moved within the sweep radius, the fingers repetitively contact the scaly portions of the fish body to remove the scales. Such an apparatus is effective in preparing a frozen fish body for skinning according to the described method of the invention.

To increase yield through increased press for a given mass of fish meat, a method of preparing fish pieces for canning is provided. The method includes the first step of maintaining the temperature of frozen, raw fish loin pieces at temperatures substantially at or below the ice crystallization temperature. The next step is to immerse the frozen, raw fish loin pieces in a broth mixture at a first temperature for a first period of time to coat the pieces with broth. Then the pieces are dipped in hot water at a second temperature and cooked for a second period of time. In a preferred version of the method, the cooking period is selected to ensure that the internal temperature of the pieces reaches about 50° C. (122° F.) for thorough cooking.

BRIEF DESCRIPTION OF THE DRAWINGS

These and other features, aspects, and advantages of the invention are better understood by reference to the following description, appended claims, and accompanying drawings in which:

BEST MODE FOR CARRYING OUT THE INVENTION

Figure 1:
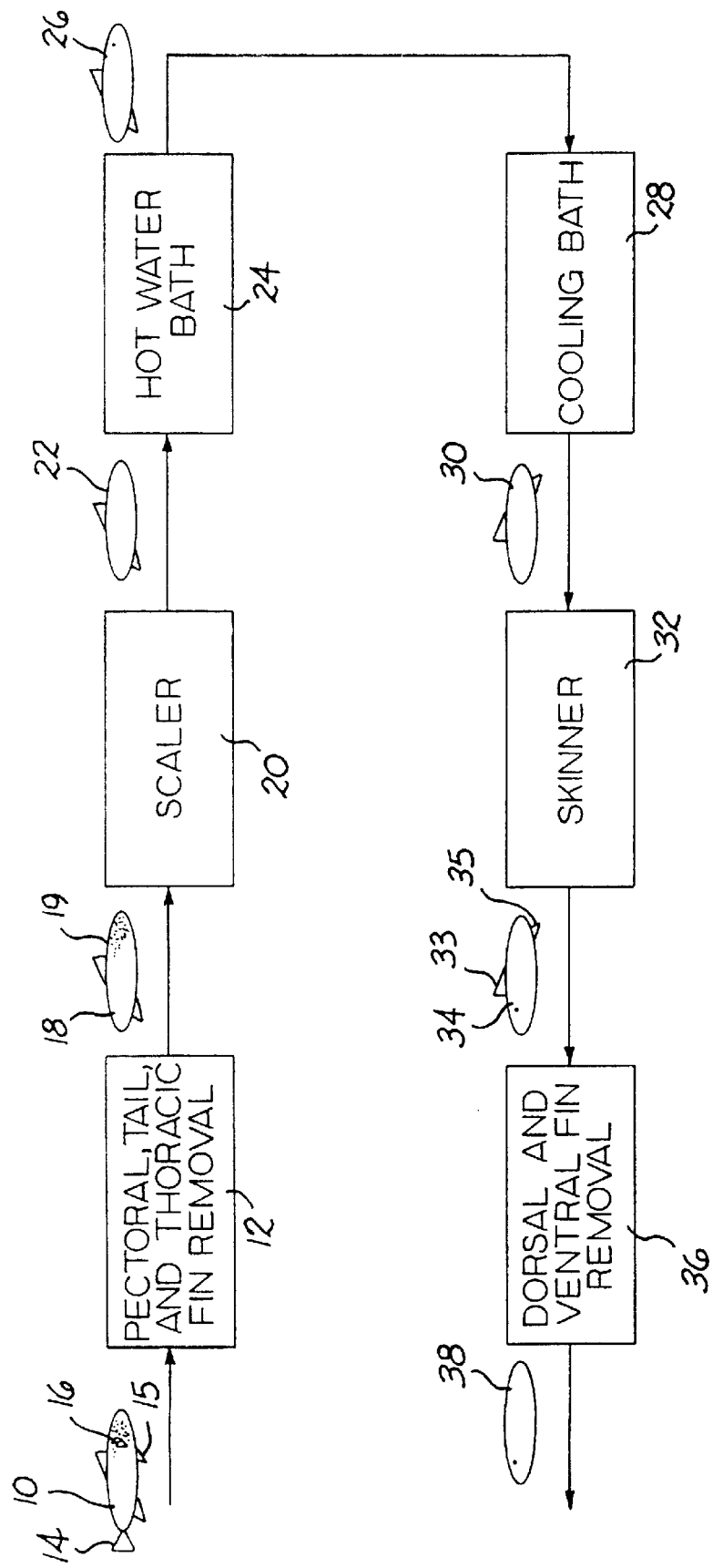
FIG. 1 is a block diagram of a method for preparing a fish body for skinning having features of the invention.

The block diagram of FIG. 1 shows a frozen fish body 10 being prepared for skinning by a method incorporating features of the invention. In a first step 12, the tail fin 14, the thoracic fins 15, and the pectoral fins 16 are optionally, but preferably, removed. The fins can be removed by manual or automatic knives, for example. Removal of these fins is easier while the fish body is frozen. The dorsal and ventral fins are more easily and preferably removed after skinning. With the tail, pectoral, and thoracic fins removed, the fish body 18 is scaled according to step 20. Details of one version of an apparatus suitable for removing fish scales 19 is described subsequently.

The scaled fish body 22 is then dipped in a hot water bath according to step 24. The temperature of the hot water bath and the immersion time period depend on the size of the fish being processed and its quality, especially its level of dehydration. Experimentation has suggested a temperature range from about 74° C. (165° F.) to about 82° C. (180° F.), with a temperature of 78° C. (172° F.) being preferred, for an immersion time period of from about seven minutes to about nine minutes, with eight minutes being preferred, for whole fish on the order of nine pounds and of good quality. Dehydrated fish of the same size typically require longer immersion periods. The hot water tends to soften the skin and to dissolve the subdural layer of connective tissue that holds the skin to the underlying flesh. The fish body is immersed long enough for this surface softening to occur, but not long enough to thaw the inner portion of the fish body. Except for the outer portion of the flesh adjacent the skin, the temperature of the fish body is preferably maintained below the crystallization temperature, i.e., below about −3° C. (28° F.).

The surface-layer-softened fish body 26 is then immersed in a second bath, as indicated by step 28, to retard further thawing of the flesh. A room temperature water bath is sufficient to stop further thawing. The fish body 30 exiting the cooling bath 28 is then ready for skinning 32. Skinning can be performed by any number of schemes, but the preparation steps described are especially designed for use with scraping-type skinning devices. One example of such a scraping-type skinning device is described in U.S. Pat. No. 5,569,068, entitled "Method and Apparatus for Skinning Fish." The disclosure of the application is incorporated by reference. Other scraping devices, including hand tools, could also be used.

The anterior and posterior dorsal fins 33 and the ventral fins 35 of the skinned fish body 34 are then removed according to step 36. The dorsal fins 33 and the ventral fins 35 are extracted from the fish body by pulling or scooping or other means. Flanking scales and skin come off with the dorsal fins to produce a frozen, skinless and finless fish portion 38.

Details of the conveyance of the fish bodies from station to station is not shown, but could be by conveyor belt. The baths could be either batch or continuous processes.

Figure 2:
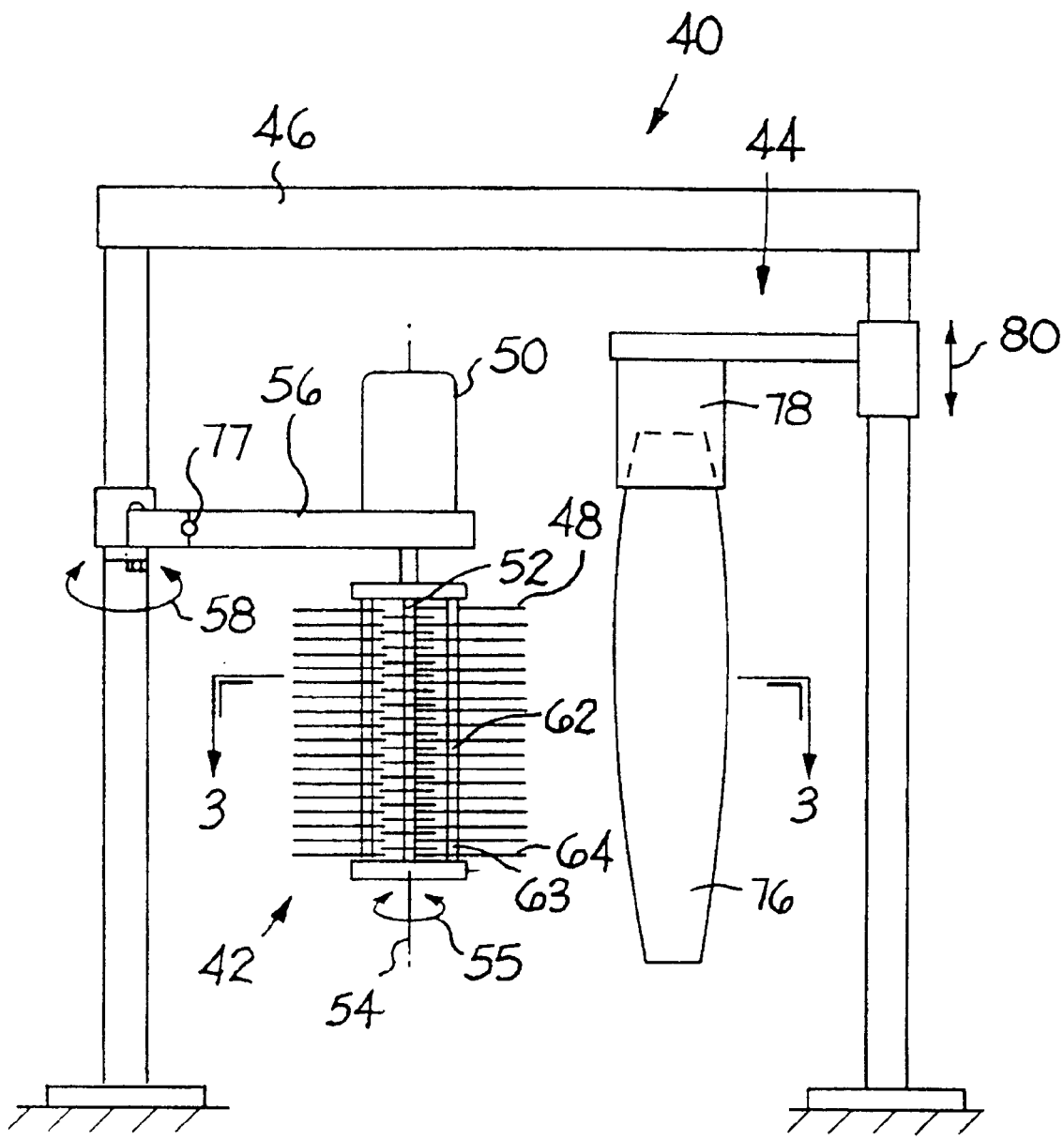
FIG. 2 is a side elevation view of one version of a scaling apparatus usable in the method of FIG. 1.
Figure 3:
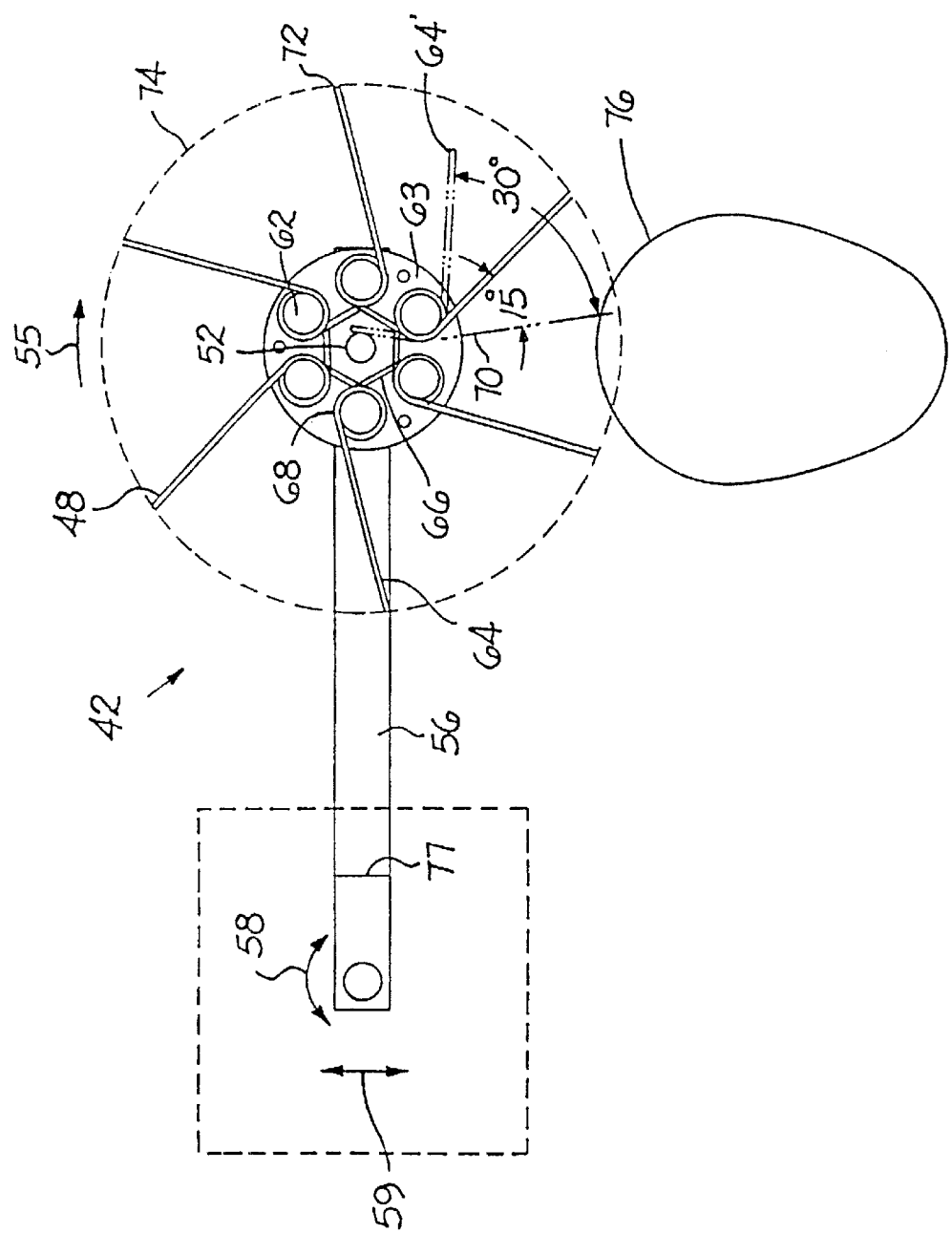
FIG. 3 is a cross-sectional view of the apparatus of FIG. 2 along cut-line 3—3.

One version of a scaling assembly 40 having features of the invention is shown in FIGS. 2–3. The scaling assembly includes a scaler assembly 42 and a fish holder assembly 44 mounted on a frame 46. The scaler assembly 42 includes a rotating assembly of wire elements 48 rotated by a motor 50 coupled to an axle 52 attached to the rotating assembly. The axle defines an axis of rotation 54 about which the rotating assembly rotates as indicated by arrow 55. In the version depicted in FIG. 2, the scaler assembly 42 is mounted on a boom 56 that is pivotally attached to the frame 46. The scaler assembly can be pivoted about the attachment into a scaling position as indicated by arrow 58 by means, such as a motor or pneumatic cylinders, not shown. Alternatively, with a different framework, the scaling assembly can be translated into position as indicated by two-headed arrow 58 in FIG. 3.

The axle 52 extends through an upper hub 60 to a lower hub 61. The axle is firmly attached to both hubs. A plurality of (in this example, six) cylindrical mandrels 62 are attached at their opposite ends to the hubs in a circumferential equi-spaced arrangement. Each mandrel acts as a pivot for a plurality of the wire elements 48. Disk-like spacers 63 separate the wire elements 48 into a few spaced groups and prevent them from bunching together by gravity at the lower hub 61. Each wire element has a finger 64 at one end and a spoke 66 at the other end. Between the finger and the spoke, the wire element is coiled loosely around the mandrel 62. The coiled portion 68 provides the wire element with spring action optimized with enough contact pressure to remove scales and sufficient give to prevent the fingers from digging into and scoring or shredding the fish flesh. The coiled portion also includes a pivot opening encircling the mandrel.

The spoke 66 of each wire element 48 and the arrangement of the mandrels 62 relative to the axle 52 serve to limit the excursion of the finger 64. As the scaler assembly 42 is rotated in the direction of arrow 55, the fingers 64 are advanced to a forward position as shown in FIG. 3, with the spoke 66 resting against the inner side of a trailing mandrel. The geometry of the layout is such that the finger lies about 15° off a radius 70 from the axle 52. The distal ends 72 of the fingers sweep out a sweep radius 74 into which the fish body 76 must be positioned to be scaled. As the fish body intersects the sweep radius, the fingers 64 hit the sides of the fish body, bounce back about another 15° into a rearward position as indicated by phantom finger 64'. This pivoting back and forth as the scaler assembly rotates effects a chipping action against the skin of the fish without scoring the flesh. With the many fingers repetitively popping against the sides of the fish, scales, like old paint, are chipped off.

The holder assembly 44 includes a gripper 78 that firmly holds an end of the fish body 76. The holder is preferably translated up and down according to arrow 80 to position the scaly portion of the fish body within the cylindrical sweep of the scaler. One could also rotate the fish body about its long axis to subject all sides of the fish body to the scaler. The angle of attack of the scaler assembly relative to the axis of the fish body could also be adjusted to improve the scaling operation by tilting the fish body or the scaler assembly, for example, about a pivot joint 77 on the boom 56. A universal joint could be used both to swing the scaler into position to engage the fish body and to adjust the angle of attack. Other versions could include one or more scaler assemblies on opposite sides of the fish body to speed the scaling process. Thus, the scaler admits of a number of configurations and adjustable rotational and translational motions of the scaler assembly relative to the fish body.

Figure 5:
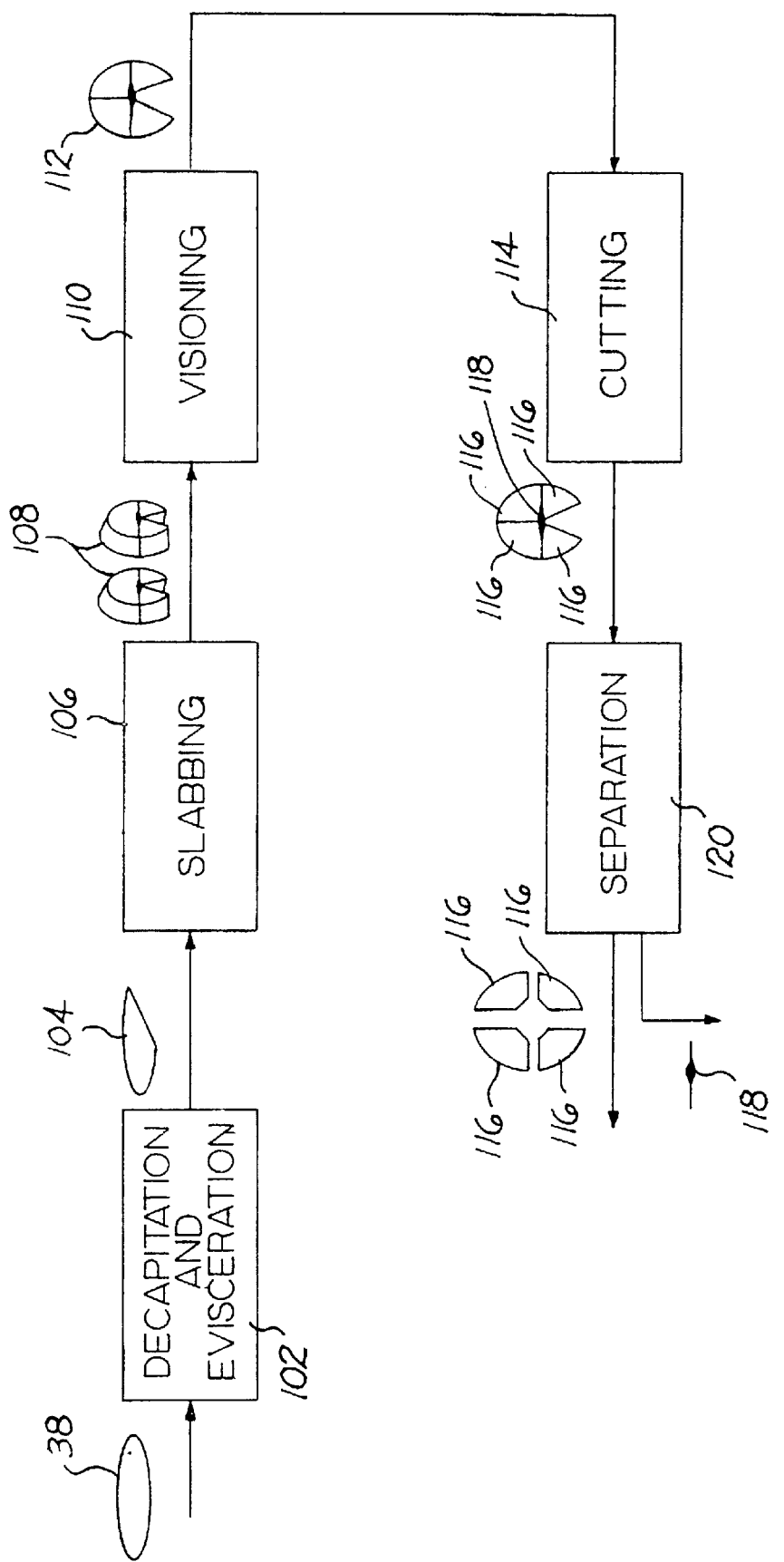
FIG. 5 is a block diagram of intermediate method steps in the processing of fish bodies intermediate to the skinning steps as in FIG. 1 and the steps preparing for canning as in FIG. 4.

After the scales, fins, and skin are removed from the fish body, the head and the entrails are removed as shown in the decapitation and evisceration step 102 of FIG. 5. The remaining deheaded, eviscerated carcass 104 is then cut into steaks 108 in a slabbing operation 106. Each steak is then optically visioned at an optical station as indicated by step 110. Digitized optical images of the steak surfaces 112 are used to compute cutting paths for a cutting knife, such as a fluid jet cutter. After the cutting step 114, in which loin portions 116 are cut from unwanted blood-stained meat 118 and other undetectable portions, the loin portions are separated from the unwanted portions 118 of each steak in a separation step 120. Preferably all these steps are performed while the fish pieces are still frozen or partially frozen. The waste portions 118 are discarded or processed for uses other than direct human consumption. The loin portions 116 are available for further downline processing. Details of exemplary apparatus for performing these functions are shown in U.S. Pat. No. 5,367,929, entitled "Fluid Jet Cutting Knife Apparatus," in U.S. Pat. No. 5,554,069, entitled "Apparatus and Method for Subdividing a Fish into a Loin-containing Portion and a Viscera-containing Portion," and in U.S. Patent Application Ser. No. 08/457,820, entitled "Slabbing Apparatus and Method," the disclosures of which are incorporated by reference.

Figure 4:
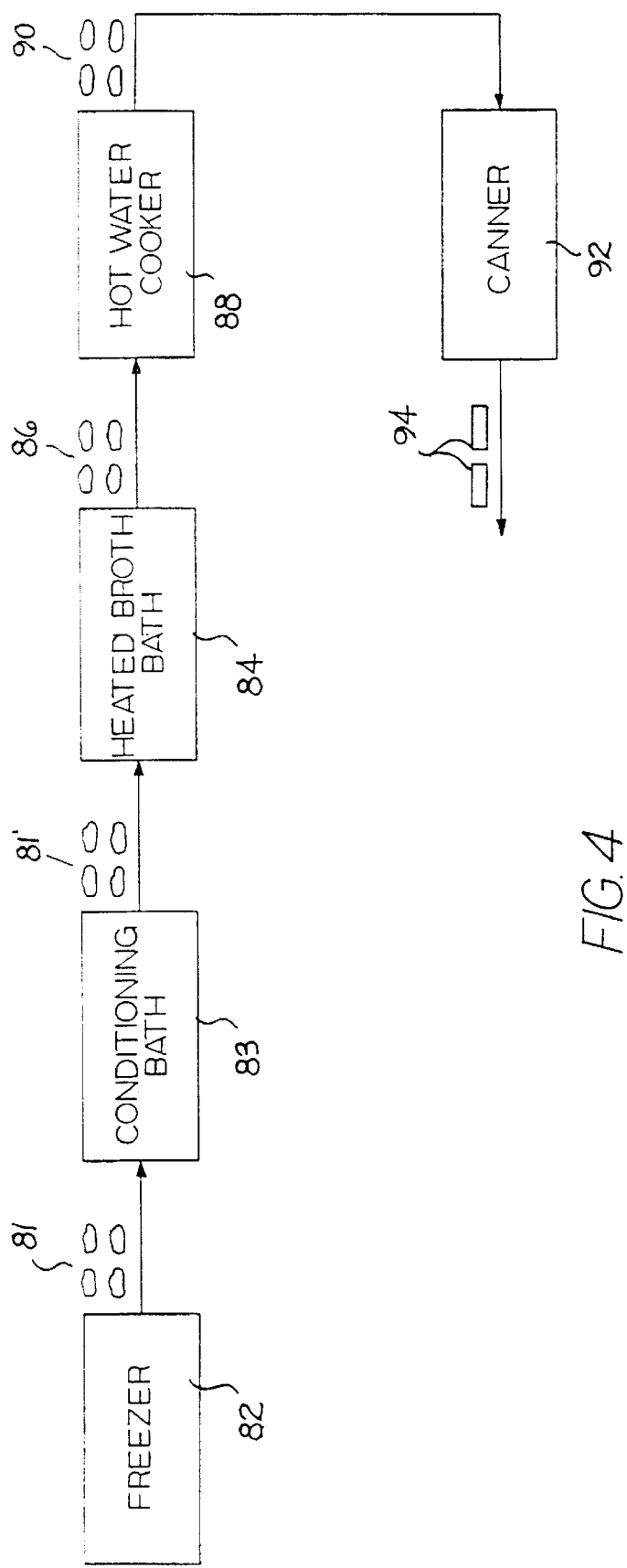
FIG. 4 is a block diagram of a method for preparing a fish for canning having features of the invention.

A cooking process having features of the invention is shown in FIG. 4. Separated frozen loin pieces 81 are maintained at a temperature at or below the ice crystallization temperature of about −3° C. (28° F.) in a storage freezer 82, for example, or received frozen directly from the processing steps of FIG. 5. (In an automated process, the loin pieces are produced by first severing transverse frozen slabs, or steaks, from the fish body and then cutting and separating the loin meat portions from the blood meat and bony portions.) As an optional first step 83, the frozen pieces 81 are first immersed in a bath containing a conditioning solution, which tends to break down the muscle fiber so that it retains more moisture. Suitable conditioning solutions include, for example, water, a peroxide solution, a tenderizer solution, or an enzyme solution. The solutions are typically at room temperature or hotter, even boiling. The optionally conditioned pieces 81' are next immersed in a bath 84 of a conventional broth mixture at a temperature of between about 74° C. (165° F.) and 80° C. (176° F.), preferably about 77° C. (170° F.). The broth, which can be any of the broths used in the fish canning industry, is allowed to penetrate and coat the thawing loin pieces along the muscle fibers of the flesh for a period of about two seconds. Alternatively, the broth could be injected into the pieces to speed absorption. The partially cooked pieces 86 that have absorbed broth are then cooked in a hot water bath 88 at a temperature of at least about 70° C. (158° F.) for a period of about 20 minutes. A preferred cooking temperature is about 71° C. (160° F.). Such a cooking temperature is high enough to kill bacteria on the outer surfaces of the pieces and to heat the core of the pieces to a temperature of about 50° C. (122° F.) to ensure thorough cooking in a reasonable time. The cooked pieces 90 are conveyed to a canner 92, which stuffs them into cans 94 before they undergo a conventional final retort. Conveyance of the pieces between process stations can be by conventional conveyance means. Immersion in the baths can be by batch or by continuous conveyance. The final result is increased yield because the process increases the propensity of the loin pieces to entrap broth mixture and liquefied proteins and thereby increase press.

Although the invention has been described in detail with reference to preferred versions, other versions are possible. Furthermore, the various temperatures and times discussed in reference to the disclosed versions depend on various factors, such as fish size, fish quality, fish temperature, and time available for processing. Consequently, the temperatures and times could be changed to adapt to different conditions or situations. Therefore, the spirit and scope of the appended claims should not be limited to the description of the preferred versions.

What is claimed is:

1. A method for skinning a frozen fish body, comprising the steps of:
    a) immersing the frozen fish body in a first bath at a first temperature for a first period of time sufficient to thaw the skin and the subdermal layer of the fish body;
    b) removing the fish body from the first bath once the subdermal layer is thawed;
    immersing the fish body in a second bath at a second temperature lower than the first temperature for a second period of time to retard further thawing;
    c) scraping the thawed skin from the fish body.
2. A method for skinning a frozen fish body as in claim 1 further comprising, before step a), the step of:
    removing scales from the frozen fish body.
3. A method for skinning a frozen fish body as in claim 1 further comprising, before step a), the step of:
    removing the pectoral, thoracic, and tail fins from the frozen fish body.
4. A method for skinning a frozen fish body as in claim 1 wherein the second temperature of the second bath is room temperature.
5. A method for skinning a frozen fish body as in claim 1 further comprising, after step c), the step of:
    removing the dorsal fins from the fish body.
6. A method for skinning a frozen fish body as in claim 1 wherein the frozen fish body is immersed in the first bath at a first temperature in a range from about 74° C. to about 82° C.
7. A method for skinning a frozen fish body as in claim 6 wherein the first temperature is about 78° C.
8. A method for skinning a frozen fish body as in claim 1 wherein the first period of time lies in a range from about seven minutes to about nine minutes.
9. A method for skinning a frozen fish body as in claim 8 wherein the first period of time is about eight minutes.
10. A method for skinning a frozen fish body as in claim 1 wherein the inner temperature of the fish body is maintained below the crystallization temperature.
11. A method for skinning a frozen fish body as in claim 1 wherein the inner temperature of the fish body is maintained below about −3° C.
12. A method for processing fish meat pieces prior to canning to increase yield comprising the steps of:
    a) maintaining the temperature of frozen raw fish meat pieces at a temperature substantially at or below the ice crystallization temperature;
    b) immersing the frozen raw fish meat pieces in a broth mixture at a first temperature for a first period of time; and
    c) immersing the fish meat pieces in water at a second temperature for a second period of time to cook the fish meat pieces.
13. A method for processing fish meat pieces prior to canning to increase yield as in claim 12 wherein, in step c), the second period of time is chosen to ensure that the pieces reach an internal temperature greater than about 50° C.
14. A method for processing fish meat pieces prior to canning to increase yield as in claim 12 further comprising, between steps a) and b), the step of:
    immersing the frozen raw fish meat pieces in a conditioning solution to increase the moisture retention of the pieces.

* * * * *